United States Patent
Zhang et al.

(10) Patent No.: US 9,130,625 B2
(45) Date of Patent: Sep. 8, 2015

(54) INTERFERENCE AVOIDANCE METHOD OF PULSE SIGNAL AND TERMINAL APPLICABLE THERETO

(71) Applicant: SHENZHEN CHINA STAR OPTOELECTRONICS TECHNOLOGY CO., LTD., Shenzhen, Guangdong (CN)

(72) Inventors: Hua Zhang, Guangdong (CN); Xianming Zhang, Guangdong (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 27 days.

(21) Appl. No.: 14/130,325

(22) PCT Filed: Dec. 11, 2013

(86) PCT No.: PCT/CN2013/089036
§ 371 (c)(1),
(2) Date: Dec. 31, 2013

(87) PCT Pub. No.: WO2015/081581
PCT Pub. Date: Jun. 11, 2015

(65) Prior Publication Data
US 2015/0155896 A1  Jun. 4, 2015

(30) Foreign Application Priority Data
Dec. 3, 2013  (CN) .......................... 2013 1 0643243

(51) Int. Cl.
*H04L 27/00* (2006.01)
*H04B 1/04* (2006.01)
*H04B 1/12* (2006.01)
*H04B 1/10* (2006.01)

(52) U.S. Cl.
CPC ............ *H04B 1/0475* (2013.01); *H04B 1/0483* (2013.01); *H04B 1/1081* (2013.01); *H04B 1/12* (2013.01)

(58) Field of Classification Search
USPC ......................................................... 375/259
See application file for complete search history.

(56) References Cited

U.S. PATENT DOCUMENTS

| 2008/0305740 | A1* | 12/2008 | Horiuchi et al. | ............. 455/11.1 |
| 2009/0245444 | A1* | 10/2009 | Fang | ............................. 375/350 |
| 2014/0184342 | A1* | 7/2014 | Chang et al. | ...................... 331/2 |

FOREIGN PATENT DOCUMENTS

CN  2884733 Y  3/2007

OTHER PUBLICATIONS

International Search Report of PCT Patent Application No. PCT/CN2013/089036 issued on May 5, 2014.

*Primary Examiner* — Tanmay Shah

(57) ABSTRACT

The present disclosure provides an interference avoidance method of a pulse signal. According to the method, before the pulse signal is transmitted, the pulse signal is split into two parallel pulse sub-signals which can be synthesized using a subtraction synthesis method and thus restored to the pulse signal. In this way, in the parallel transmissions of the two parallel pulse sub-signals, interferences from which the two sub-signals suffer are identical to each other. Thus, after the two parallel pulse sub-signals are synthesized using the subtraction synthesis method, the interference signals offset each other to allow the synthesized pulse signal to carry no interference signals, which effectively avoids false control caused by the interference signals carried in the transmission of the pulse signal and simultaneously avoids the false control caused by an attenuation or a distortion of the pulse signal due to the traditional filtering method.

12 Claims, 2 Drawing Sheets

INTERFERENCE AVOIDANCE METHOD OF PULSE SIGNAL AND TERMINAL APPLICABLE THERETO

BACKGROUND

1. Technical Field

The present disclosure relates to processing technologies of pulse signals, and more particularly, to an interference avoidance method of a pulse signal and a terminal applicable to the method.

2. Description of Related Art

A liquid crystal display synchronization signal Vsync or a chip select (CS) signal in the SPI (Serial Peripheral Interface) protocol is a low frequency pulse signal having a frequency being 60 Hz or 120 Hz. The pulse signal enters a MCU (Micro Control Unit) chip or a LED constant current driving IC (Integrated Circuit) chip through a single pulse signal channel (signal line). The MCU chip or the driving IC chip implements corresponding information in a data signal and performs corresponding controlling operation (for example, controlling on and off of a LED backlight or a delay order of the LED backlight) after detecting a rising edge or a falling edge of the pulse signal.

However, in the process of transmitting the pulse signal from a pulse signal transmitting terminal to a pulse signal receiving terminal, the pulse signal may easily suffer interference from a low frequency interference signal generated by other power components in the transmitting line of the pulse signal. After the interference signal interferes with the Vsync signal or the CS signal, false operation of the MCU chip or the LED constant current driving IC chip may be caused since the Vsync signal or the CS signal is also a pulse signal having a short duration. Filtering the Vsync signal or the CS signal by a traditional RC filtering method may cause an attenuation or a distortion of the Vsync signal or the CS signal, which may also cause false operation (for example, the false operation of the LED backlight controlling circuit).

SUMMARY

The main object of the present disclosure is to provide an interference avoidance method of a pulse signal to avoid false control caused by interference signals carried in the transmission of the pulse signal such as a Vsync signal or a CS signal, and simultaneously avoid false control caused by an attenuation or a distortion of the pulse signal due to a traditional filtering method.

The present disclosure further provides a terminal applicable to the above interference avoidance method, including a pulse signal transmitting terminal and a pulse signal receiving terminal, for avoiding false control caused by interference signals carried in the transmission of the pulse signal such as a Vsync signal or a CS signal, and simultaneously avoiding false control caused by an attenuation or a distortion of the pulse signal due to a traditional filtering method The interference avoidance method of a pulse signal provided in the present disclosure includes:

a pulse signal transmitting terminal splitting a to-be-transmitted pulse signal into two parallel pulse sub-signals according to a preset splitting rule;

a pulse signal transmitting terminal transmitting the split two parallel pulse sub-signals to a pulse signal receiving terminal in parallel;

the pulse signal receiving terminal receiving the two parallel pulse sub-signals from the pulse signal transmitting terminal and synthesizing the two parallel pulse sub-signals using a subtraction synthesis method to restore the two parallel pulse sub-signals to the to-be-transmitted pulse signal; and the pulse signal receiving terminal implementing the restored to-be-transmitted pulse signal.

Preferably, the preset splitting rule includes:

generating a first pulse sub-signal by adding a preset value to both a logic high level signal and a logic low level signal of the to-be-transmitted pulse signal; and generating a DC voltage signal which is parallel with the first pulse sub-signal and has an amplitude being equal to the preset value accompanying with the first pulse sub-signal.

Preferably, the preset splitting rule includes:

generating a first pulse sub-signal by adding a preset value to a logic high level signal of the to-be-transmitted pulse signal and remaining a logic low level signal of the to-be-transmitted pulse signal unchanged;

generating a second pulse sub-signal parallel with the first pulse sub-signal accompanying with the first pulse sub-signal, wherein an amplitude of a logic high level signal of the second pulse sub-signal is equal to the preset value and an amplitude of a logic low level signal of the second pulse pub-signal is equal to that of the logic low level signal of the to-be-transmitted pulse signal.

Preferably, the method further includes a following step before the step of a pulse signal transmitting terminal splitting a to-be-transmitted pulse signal into two parallel pulse sub-signals according to a preset splitting rule:

the pulse signal transmitting terminal reading the to-be-transmitted pulse signal pre-stored in the pulse signal transmitting terminal or generating the to-be-transmitted pulse signal.

Preferably, the method further includes a following step before the step of a pulse signal transmitting terminal splitting a to-be-transmitted pulse signal into two parallel pulse sub-signals according to a preset splitting rule:

a pulse signal generating terminal generating the to-be-transmitted pulse signal and transmitting the generated to-be-transmitted pulse signal to the pulse signal transmitting terminal.

The pulse signal transmitting terminal applicable to the above method provided in the present disclosure includes:

a signal splitting unit configured for splitting the to-be-transmitted signal into the two parallel pulse sub-signals according to the preset splitting rule;

a signal transmitting unit configured for transmitting the split two parallel pulse sub-signals to the pulse signal receiving terminal.

Preferably, the pulse signal transmitting terminal further includes:

a pulse signal generating unit configured for generating the to-be-transmitted pulse signal; or a storing unit for storing the to-be-transmitted pulse signal.

Preferably, the pulse signal transmitting terminal further includes a signal receiving unit configured for receiving the to-be-transmitted pulse signal from the pulse signal generating unit.

The pulse signal receiving terminal applicable to the above method provided in the present disclosure, including:

a signal receiving unit configured for detecting and receiving the two parallel pulse sub-signals transmitted in parallel from the pulse signal transmitting terminal;

a signal synthesizing unit configured for synthesizing the two parallel pulse sub-signals received by the signal receiving unit using a subtraction synthesis method to restore the two parallel pulse sub-signals to the to-be-transmitted pulse signal.

According to the method, before the pulse signal is transmitted, the pulse signal is split into two parallel pulse sub-signals which can be synthesized using a subtraction synthesis method and thus restored to the pulse signal. In this way, in the parallel transmissions of the two parallel pulse sub-signals, interferences from which the two sub-signals suffer are identical to each other. Thus, after the two parallel pulse sub-signals are synthesized using the subtraction synthesis method, the interference signals offset each other to allow the synthesized pulse signal to carry no interference signals, which effectively avoids false control caused by the interference signals carried in the transmission of the pulse signal and simultaneously avoids the false control caused by an attenuation or a distortion of the pulse signal due to the traditional filtering method.

DESCRIPTION OF THE DRAWINGS

Many aspects of the embodiments can be better understood with reference to the following drawings. The components in the drawings are not necessarily dawns to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment is this disclosure are not necessarily to the same embodiment, and such references mean at least one.

It also should be noted that "a pulse signal for controlling the LED backlight" is taken as an example in the following embodiment, and one having ordinary skill in the art should know that the following embodiment is also applicable to other suitable high-frequency pulse signal, which is not given in detail here.

Figure 1:
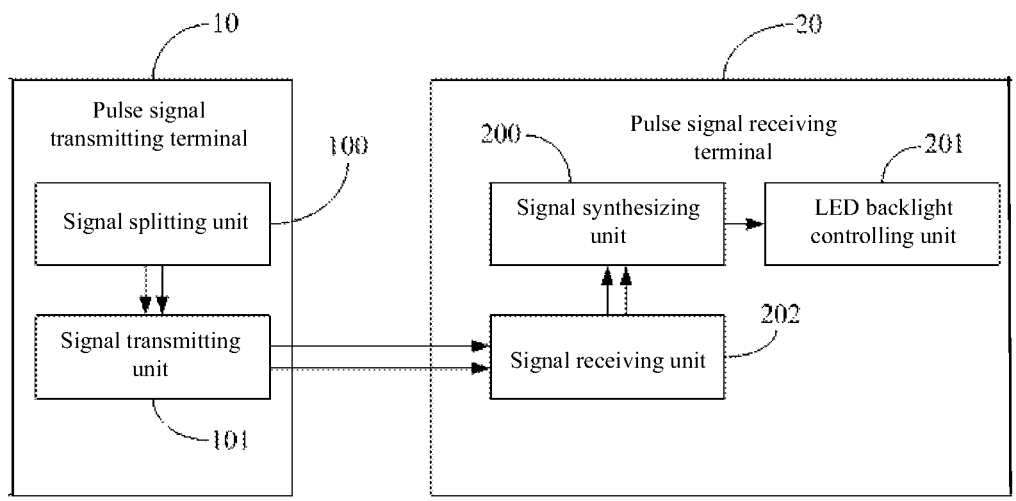
FIG. 1 is a schematic view of an interference avoidance system of a pulse signal in accordance with an embodiment of the present disclosure.

FIG. 1 is a schematic view of an interference avoidance system of a pulse signal in accordance with an embodiment of the present disclosure. The interference avoidance system includes a pulse signal transmitting terminal 10 and a pulse signal receiving terminal 20 communicating with the pulse signal transmitting terminal 10 through parallel pulse signal channels. The parallel pulse signal channels (for example, two adjacent parallel pulse signal lines) are configured for transmitting two parallel pulse signals in parallel. The pulse signal is provided to control on and off of a LED backlight and to control a delay order of the LED backlight.

The pulse signal transmitting terminal 10 includes a signal splitting unit 100 and a signal transmitting unit 101 communicating with the signal splitting unit 100. The pulse signal receiving terminal 20 includes a signal receiving unit 202 and a signal synthesizing unit 200 communicating with the signal receiving unit 202 through parallel pulse signal channels, and a LED backlight controlling unit 201 communicating with the signal synthesizing unit 200.

Figure 3A:
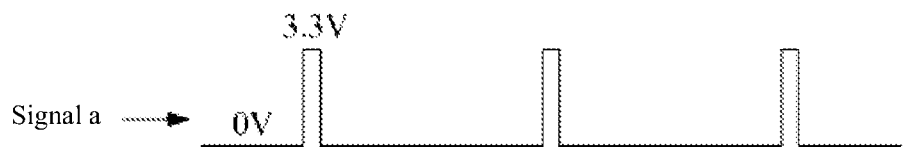
FIG. 3A is a schematic view showing a waveform of the pulse signal of the present disclosure.
Figure 3B:
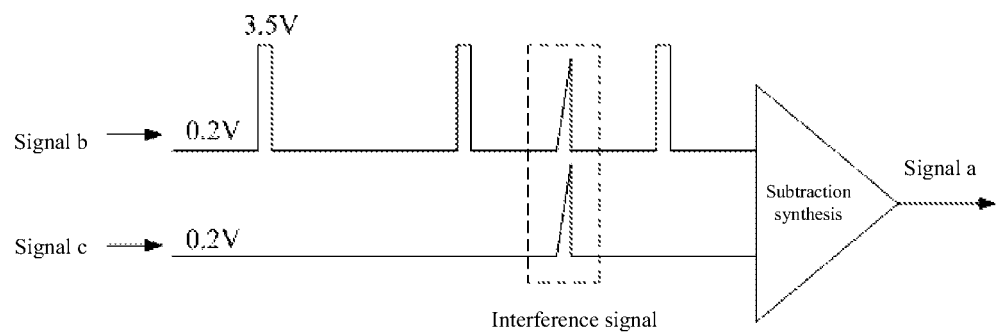
FIG. 3B is a schematic view illustrating a first process of avoiding interference with the pulse signal by applying the system of FIG. 1 or the method of FIG. 2.
Figure 3C:
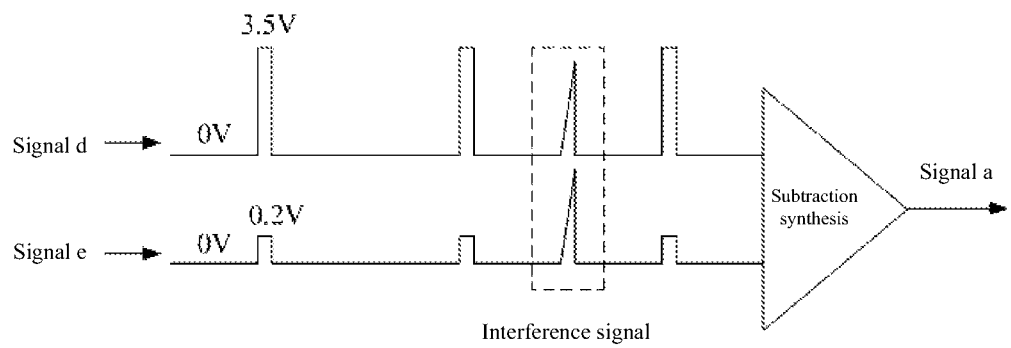
FIG. 3C is a schematic view illustrating a second process of avoiding interference with the pulse-signal by applying the system of FIG. 1 or the method of FIG. 2.

The signal splitting unit 100 is configured for splitting a to-be-transmitted pulse signal (for example, the pulse signal a shown in FIG. 3A) into two parallel pulse sub-signals (for example, the two parallel pulse sub-signals b and c shown in FIG. 3B, or, the two parallel pulse sub-signals d and e shown in FIG. 3C) according to a preset splitting rule. By splitting the to-be-transmitted pulse signal into two parallel pulse sub-signals and transmitting the two parallel pulse sub-signals in parallel, interferences from which the pulse sub-signals suffer are identical to each other (for example, waveforms of interference signals carried in the two parallel pulse sub-signals b and c shown in FIG. 3B are identical to each other, or, waveforms of interference signals carried in the two parallel pulse sub-signals d and e shown in FIG. 3C are identical to each other). Therefore, after the two parallel pulse sub-signals are synthesized using a subtraction synthesis method (that is, subtracting the two pulse sub-signals), the interference signals offset each other and thus the synthesized pulse signal carries no interference signals.

It is noted that the to-be-transmitted pulse signal can be obtained in one of the following ways.

In a first way, the pulse signal transmitting terminal 10 further includes a pulse signal generating unit (not shown) and the pulse signal transmitting terminal 10 generates the pulse signal which is to be transmitted to the pulse signal receiving terminal 20 via the pulse signal generating unit, which allows the pulse signal receiving terminal 20 to control the on and off of the LED backlight and to control the delay order of the LED backlight according to the pulse signal received from the pulse signal transmitting terminal 10.

In a second way, the pulse signal transmitting terminal 10 receives the pulse signal which is to be transmitted to the pulse signal receiving terminal 20 from a pulse signal generating terminal (not shown) and transmits the received pulse signal to the pulse signal receiving terminal 20, which allows the pulse signal receiving terminal 20 to control the on and off of the LED backlight and to control the delay order of the LED backlight according to the pulse signal received from the pulse signal transmitting terminal 10.

In a third way, the pulse signal transmitting terminal 10 further includes a storing unit (not shown) storing the pulse signal which is to be transmitted to the pulse signal receiving terminal 20. The pulse signal transmitting terminal 10 reads the pulse signal which is to be transmitted to the pulse signal receiving terminal 20 from the storing unit and transmits the pulse signal to the pulse signal receiving terminal 20, which allows the pulse signal receiving terminal 20 to control the on and off of the LED backlight and to control the delay order of the LED backlight according to the pulse signal received from the pulse signal transmitting terminal 10.

Furthermore, the preset splitting rule can be one of the following splitting rules.

A first splitting rule: generating a first pulse sub-signal by adding a preset value (for example, 0.2V) to a logic high level signal and a logic low level signal of the to-be-transmitted pulse signal (for example, the pulse signal a shown in FIG. 3A); and generating a DC voltage signal (that is, a second pulse sub-signal) which is parallel with the first pulse sub-signal and has an amplitude being equal to the preset value, accompanying with the first pulse sub-signal. For example, the preset value (0.2V) is simultaneously added to the logic high level signal (3.3V) and the logic low level signal (0V) of the pulse signal a to generate the first pulse sub-signal (for example, the pulse signal b shown in FIG. 3B), and the DC voltage signal (that is, the second pulse sub-signal, for example, the pulse signal c shown in FIG. 3B) which is parallel with the first pulse sub-signal and has the amplitude being equal to the preset value (0.2V) is also generated accompanying with the first pulse sub-signal. After the two pulse sub-signals generated according to the first splitting rule are synthesized using the subtraction synthesis method (that is, subtracting the two parallel pulse sub-signals), the interference signals offset each other, a logic high level signal of the synthesized pulse signal is restored to be the logic high level signal of the to-be-transmitted pulse signal, and a logic low level signal of the synthesized pulse signal is restored to the logic low level signal of the to-be-transmitted pulse signal.

A second splitting rule: generating the first pulse sub-signal by adding a preset value (for example, 0.2V) to the logic high level signal of the to-be-transmitted pulse signal (for example, the pulse signal a shown in FIG. 3A) and remaining the logic low level signal of the to-be-transmitted pulse signal unchanged, and generating the second pulse sub-signal parallel with the first pulse sub-signal accompanying with the first pulse sub-signal, wherein an amplitude of a logic high level signal of the second pulse sub-signal is equal to the preset value and an amplitude of a logic low level signal of the second pulse sub-signal is equal to that of the logic low level signal of the to-be-transmitted pulse signal. For example, the preset value (0.2V) is added to the logic high level signal (3.3V) of the pulse signal a shown in FIG. 3A and the logic low level signal of the pulse signal is remained unchanged to generate the first pulse sub-signal (for example, the pulse signal d shown in FIG. 3C), and the second pulse sub-signal (for example, the pulse signal e shown in FIG. 3C) parallel with the first pulse sub-signal is generated accompanying with the first pulse sub-signal. The amplitude of the logic high level signal of the second pulse sub-signal is equal to the preset value (0.2V) and the amplitude of the logic low level signal of the second pulse sub-signal is equal to that of the logic low level signal (0V) of the to-be-transmitted pulse signal. After the two pulse sub-signals generated according to the second splitting rule are synthesized using the subtraction synthesis method (that is, subtracting the two parallel pulse sub-signals), the interference signals offset each other, the logic high level signal of the synthesized pulse signal is restored to be the logic high level signal of the to-be-transmitted pulse signal, and the logic low level signal of the synthesized pulse signal is restored to the logic low level signal of the to-be-transmitted pulse signal.

The signal transmitting unit 101 is configured for transmitting the two parallel pulse sub-signals split by the signal splitting unit 100 to the signal receiving unit 202 of the pulse signal receiving terminal 20 through parallel signal lines.

The signal receiving unit 202 is configured for detecting and receiving the two parallel pulse sub-signals from the signal transmitting unit 101 of the signal transmitting terminal 10.

The signal synthesizing unit 200 is configured for synthesizing the two received parallel pulse sub-signals (for example, the two parallel pulse sub-signals b and c shown in FIG. 3B, or the two parallel pulse sub-signals d and e shown in FIG. 3C) using the subtraction synthesis method to restore the two pulse sub-signals to the to-be-transmitted pulse signal (for example, the pulse signal a shown in FIG. 3A).

The LED backlight controlling unit 201 is configured for controlling the on and off of the LED backlight and the delay order of the LED backlight according to the pulse signal restored by the signal synthesizing unit 200.

Figure 2:
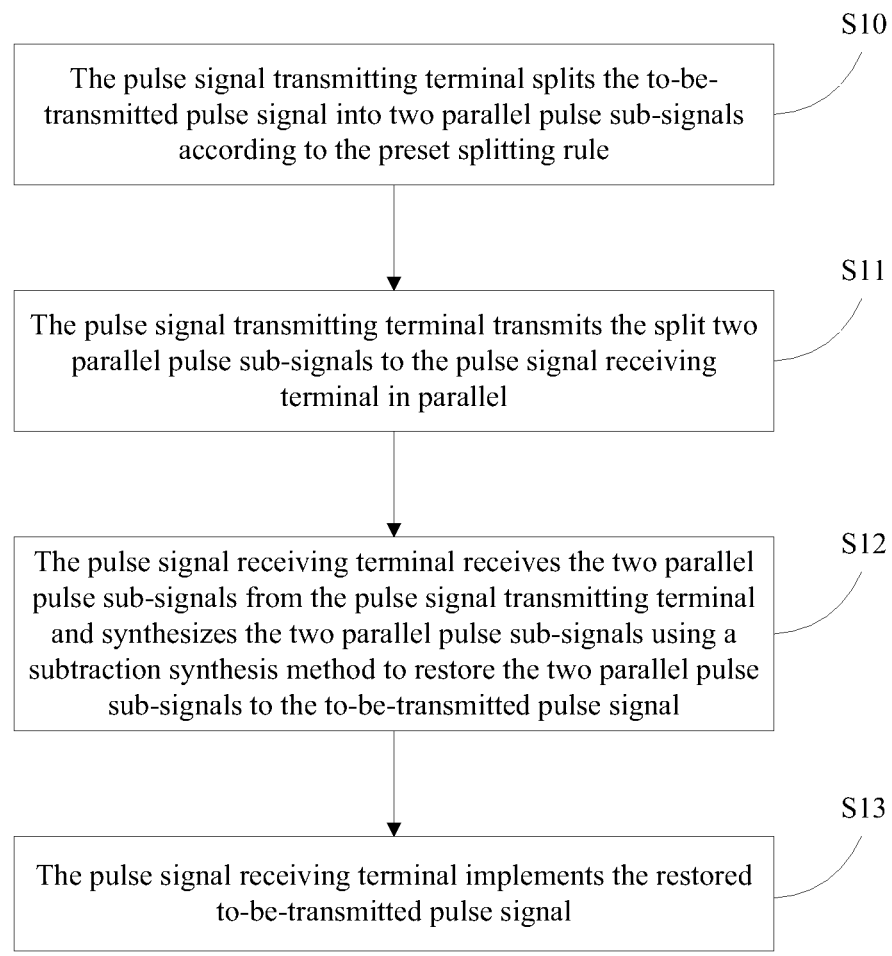
FIG. 2 is a flow chart of an interference avoidance method of a pulse signal in accordance with an embodiment of the present disclosure.

FIG. 2 is a flow chart of an interference avoidance method of a pulse signal in accordance with an embodiment of the present disclosure.

A pulse signal transmitting terminal splits a to-be-transmitted pulse signal into two parallel pulse sub-signals according to a preset splitting rule; the pulse signal transmitting terminal transmits the split two parallel pulse sub-signals in parallel to a pulse signal receiving terminal; the pulse signal receiving terminal receives the two parallel pulse sub-signals from the pulse signal transmitting terminal and synthesizes the two parallel pulse sub-signals using a subtraction synthesis method to restore the two pulse sub-signals to the to-be-transmitted signal; and the pulse signal receiving terminal implements the restored to-be-transmitted pulse signal.

The following description gradually realizes the interference avoidance of the pulse signal by combining with the embodiment shown in FIG. 1.

Step S10, the signal splitting unit 100 of the pulse signal transmitting terminal 10 splits the to-be-transmitted pulse signal (for example, the pulse signal a shown in FIG. 3A) into two parallel pulse sub-signals (for example, the two parallel pulse sub-signals b and c shown in FIG. 3B, or, the two parallel pulse sub-signals d and e shown in FIG. 3C) according to the preset splitting rule. By splitting the to-be-transmitted pulse signal into two parallel pulse sub-signals and transmitting the two parallel pulse sub-signals in parallel, interferences from which the pulse sub-signals suffer are identical to each other (for example, waveforms of interference signals carried in the two parallel pulse sub-signals b and c shown in FIG. 3B are identical to each other, or, waveforms of interference signals carried in the two parallel pulse sub-signals d and e shown in FIG. 3C are identical to each other). Therefore, after the two parallel pulse sub-signals are synthesized using a subtraction synthesis method (that is, subtracting the two pulse sub-signals), the interference signals offset each other and thus the synthesized pulse signal carries no interference signals.

Step S11, the signal transmitting unit 101 of the pulse signal transmitting terminal 10 transmits the two parallel pulse sub-signals split by the signal splitting unit 100 to the signal receiving unit 202 of the pulse signal receiving terminal 20 in parallel.

Step S12, the signal receiving unit 202 of the pulse signal receiving terminal 20 detects and receives the two parallel pulse sub-signals from the signal transmitting unit 101 of the pulse signal transmitting terminal 10. The signal synthesizing unit 200 of the pulse signal receiving terminal 20 synthesizes the two parallel pulse sub-signals (for example, the two parallel pulse sub-signals b and c shown in FIG. 3B, or, the two parallel pulse sub-signals d and e shown in FIG. 3C) using the subtraction synthesis method to restore the two pulse sub-signals to the to-be-transmitted pulse signal (for example, the pulse signal a shown in FIG. 3A).

Step S13, the LED controlling unit 201 of the pulse signal receiving terminal 20 controls the on and off of the LED backlight and the delay order of the LED backlight according to the pulse signal restored by the signal synthesizing unit 200.

Even though information and the advantages of the present embodiments have been set forth in the foregoing description, together with details of the mechanisms and functions of the present embodiments, the disclosure is illustrative only; and that changes may be made in detail, especially in matters of shape, size, and arrangement of parts within the principles of the present embodiments to the full extend indicated by the broad general meaning of the terms in which the appended claims are expressed.

What is claimed is:

1. An interference avoidance method of a pulse signal, comprising:
   a pulse signal transmitting terminal splitting a to-be-transmitted pulse signal into two parallel pulse sub-signals according to a preset splitting rule;
   a pulse signal transmitting terminal transmitting the split two parallel pulse sub-signals to a pulse signal receiving terminal in parallel;
   the pulse signal receiving terminal receiving the two parallel pulse sub-signals from the pulse signal transmitting terminal and synthesizing the two parallel pulse sub-signals using a subtraction synthesis method to restore the two parallel pulse sub-signals to the to-be-transmitted pulse signal; and
   the pulse signal receiving terminal implementing the restored to-be-transmitted pulse signal;
   wherein the preset splitting rule comprises:
   generating a first pulse sub-signal by adding a preset value to both a logic high level signal and a logic low level signal of the to-be-transmitted pulse signal; and
   generating a DC voltage signal which is parallel with the first pulse sub-signal and has an amplitude being equal to the preset value accompanying with the first pulse sub-signal.

2. The method of claim 1 further comprising a following step before the step of a pulse signal transmitting terminal splitting a to-be-transmitted pulse signal into two parallel pulse sub-signals according to a preset splitting rule:
   the pulse signal transmitting terminal reading the to-be-transmitted pulse signal pre-stored in the pulse signal transmitting terminal or generating the to-be-transmitted pulse signal.

3. The method of claim 1 further comprising a following step before the step of a pulse signal transmitting terminal splitting a to-be-transmitted pulse signal into two parallel pulse sub-signals according to a preset splitting rule:
   a pulse signal generating terminal generating the to-be-transmitted pulse signal and transmitting the generated to-be-transmitted pulse signal to the pulse signal transmitting terminal.

4. A pulse signal transmitting terminal applicable to the method of claim 1, comprising:
   a signal splitting unit configured for splitting the to-be-transmitted signal into the two parallel pulse sub-signals according to the preset splitting rule;
   a signal transmitting unit configured for transmitting the split two parallel pulse sub-signals to the pulse signal receiving terminal.

5. The pulse signal transmitting terminal of claim 4 further comprising:
   a pulse signal generating unit configured for generating the to-be-transmitted pulse signal; or
   a storing unit for storing the to-be-transmitted pulse signal.

6. A pulse signal receiving terminal applicable to the method of claim 1, comprising:
   a signal receiving unit configured for detecting and receiving the two parallel pulse sub-signals transmitted in parallel from the pulse signal transmitting terminal;
   a signal synthesizing unit configured for synthesizing the two parallel pulse sub-signals received by the signal receiving unit using a subtraction synthesis method to restore the two parallel pulse sub-signals to the to-be-transmitted pulse signal.

7. An interference avoidance method of a pulse signal, comprising:
   a pulse signal transmitting terminal splitting a to-be-transmitted pulse signal into two parallel pulse sub-signals according to a preset splitting rule;
   a pulse signal transmitting terminal transmitting the split two parallel pulse sub-signals to a pulse signal receiving terminal in parallel;
   the pulse signal receiving terminal receiving the two parallel pulse sub-signals from the pulse signal transmitting terminal and synthesizing the two parallel pulse sub-signals using a subtraction synthesis method to restore the two parallel pulse sub-signals to the to-be-transmitted pulse signal; and
   the pulse signal receiving terminal implementing the restored to-be-transmitted pulse signal;
   wherein the preset splitting rule comprises:
   generating a first pulse sub-signal by adding a preset value to a logic high level signal of the to-be-transmitted pulse signal and remaining a logic low level signal of the to-be-transmitted pulse signal unchanged;
   generating a second pulse sub-signal parallel with the first pulse sub-signal accompanying with the first pulse sub-signal, wherein an amplitude of a logic high level signal of the second pulse sub-signal is equal to the preset value and an amplitude of a logic low level signal of the second pulse pub-signal is equal to that of the logic low level signal of the to-be-transmitted pulse signal.

8. The method of claim 7 further comprising a following step before the step of a pulse signal transmitting terminal splitting a to-be-transmitted pulse signal into two parallel pulse sub-signals according to a preset splitting rule:
   the pulse signal transmitting terminal reading the to-be-transmitted pulse signal pre-stored in the pulse signal transmitting terminal or generating the to-be-transmitted pulse signal.

9. The method of claim 7 further comprising a following step before the step of a pulse signal transmitting terminal splitting a to-be-transmitted pulse signal into two parallel pulse sub-signals according to a preset splitting rule:
   a pulse signal generating terminal generating the to-be-transmitted pulse signal and transmitting the generated to-be-transmitted pulse signal to the pulse signal transmitting terminal.

10. A pulse signal transmitting terminal applicable to the method of claim 7, comprising:
    a signal splitting unit configured for splitting the to-be-transmitted signal into the two parallel pulse sub-signals according to the preset splitting rule;
    a signal transmitting unit configured for transmitting the split two parallel pulse sub-signals to the pulse signal receiving terminal.

11. The pulse signal transmitting terminal of claim 10 further comprising:
    a pulse signal generating unit configured for generating the to-be-transmitted pulse signal; or
    a storing unit for storing the to-be-transmitted pulse signal.

12. A pulse signal receiving terminal applicable to the method of claim 7, comprising:
    a signal receiving unit configured for detecting and receiving the two parallel pulse sub-signals transmitted in parallel from the pulse signal transmitting terminal;
    a signal synthesizing unit configured for synthesizing the two parallel pulse sub-signals received by the signal receiving unit using a subtraction synthesis method to restore the two parallel pulse sub-signals to the to-be-transmitted pulse signal.

* * * * *